Jan. 24, 1928.
E. T. TURNER
1,656,964
MACHINE FOR FACILITATING THE REMOVAL OF TIRES FROM RIMS
Filed March 31, 1927
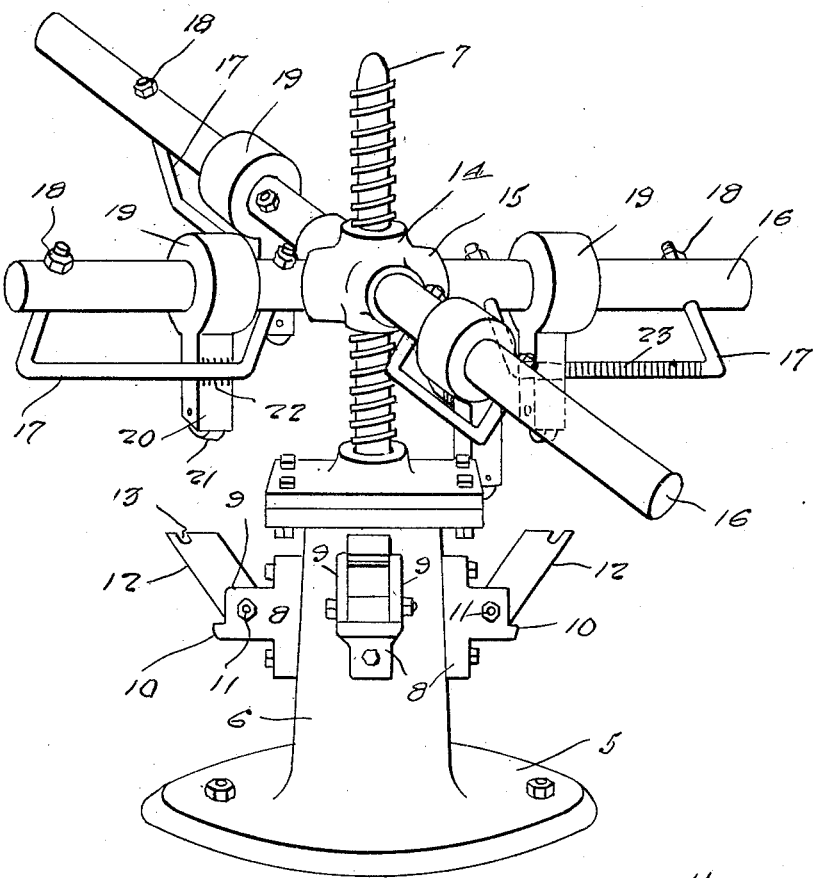
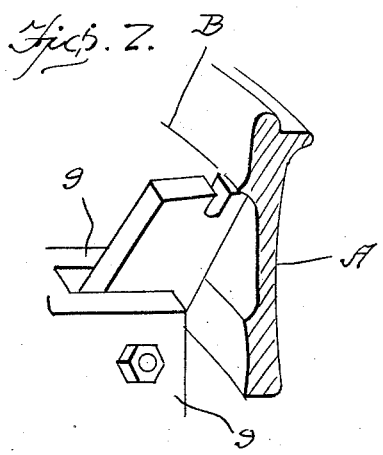
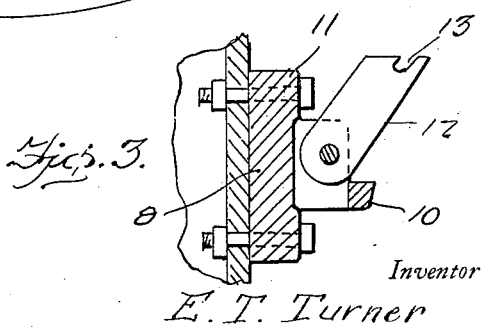
Inventor
E. T. Turner
By *Clarence A. O'Brien*
Attorney Patented Jan. 24, 1928.

1,656,964

UNITED STATES PATENT OFFICE.

EMZY T. TURNER, OF STROUD, OKLAHOMA.

MACHINE FOR FACILITATING THE REMOVAL OF TIRES FROM RIMS.

Application filed March 31, 1927. Serial No. 179,927.

This invention relates to new and useful improvements in tire removing devices and aims to provide a novel relatively simple and efficient device whereby tires may be quickly forced from the solid non-collapsible types of rims and this in a rapid manner and without bending the rims or without damaging the tires.

In carrying out the present invention there is provided means for holding a tire carrying rim, and this regardless of the size thereof, other means being provided for engagement with the tire and so constructed as to force the tire from the rim during the operation of the machine, said tire engaging means being also adjustable so as to facilitate the removal of tires from rims of varying sizes.

An important object of the present invention is to provide a machine of this character that is readily adjustable to tires and rims of varying sizes and one that may be operated by a single person and this without requiring great effort.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a perspective of my improved machine.

Figure 2 is a fragmentary perspective of one of the rim supporting dogs, the rim being fragmentarily disclosed in perspective and cross section, and Figure 3 is a fragmentary section disclosing one of the dog units per se.

Now having particular reference to the drawing, my novel machine consists of a base 5 from the center of which rises a standard 6 preferably of four sided construction and to the upper end of which is rigidly attached a vertically projecting non-rotating worm spindle 7. Securely bolted to the four sides of the standard 6 are dog brackets 8, each of which is formed at its outer side with outwardly projecting spaced ears 9—9 extending across the lower edges of which is a connecting web 10. Pivoted between these ears 9—9 above the web 10 as at 11 is a plate dog 12, the upper edge of each of which is of plano configuration as clearly disclosed in the three views.

These dogs are adapted to support a solid non-collapsible rim of the type fragmentarily disclosed in Figure 2 and designated by the reference character A. Rims of this character are usually formed upon their inner surfaces with a circumferential shoulder B beneath which the upper ends of the dogs 12 are arranged so as to support the rim upon which is the usual tire, not disclosed, in horizontal position around the base standard 6. The upper edge of each dog 12 is formed with a notch 13 so as to permit of the support of the smaller designs of solid non-collapsible rims.

Threaded upon the worm spindle 7 is a rotatable collar 14 formed at its surface with four equally spaced sockets 15 within which are rigidly mounted the inner ends of circular bars 16, also four in number. Associated with each bar 16 is a downwardly and diagonally extending elongated U-shaped bumper bar 17, the right angular ends of which are engaged within openings in the bars 16 and secured thereto by nuts 18 threaded upon the ends thereof. The horizontal portions of these bumper bars are in spaced parallel relation with the bars 16 as clearly disclosed in Figure 1.

Freely slidable upon each bar 16 within the ends of its respective bumper 17 is a collar 19 formed with a depending short arm 20 that engages against its respective bumper 17. The lower end of each arm is constructed for receiving a roller 21, while the surface of the arm in engagement with its bumper is formed with teeth 22 for engaging teeth 23 at the arm contacting surface of the bumper for preventing the movement of the arm carrying collar upon its particular bar 16 after the collar has been properly adjusted and the arm swung into engagement with the bumper.

As disclosed in Figure 1, two opposed arms 16 are of greater length than the other two arms so as to provide turning handles for the collar 14 that is threaded upon the worm 7. Obviously, after a tire carrying rim has been properly supported upon the dogs 12 and the roller carrying collars 19 have been adjusted upon their particular bars so as to engage the tire upon the rim, the elongated bars 16 are then grasped and turned so that the collar 14 is threaded downwardly upon the worm 7 which will of course cause the removal of the tire from the rim by reason of the engagement of the rollers 21 thereagainst.

It will thus be seen that I have provided a highly novel, simple, and efficiently operating tire removing machine that is well adapted for all the purposes heretofore designated and even though I have herein shown and described the invention as consisting of certain detail structural elements it is nevertheless to be understood that some changes may be made therein without affecting the spirit and scope of the appended claims.

Having thus described the invention, what I claim is:—

1. In a tire removing machine of the character described, a rigid standard, a plurality of dogs arranged in spaced relation around the standard for supporting a tire carrying rim, a stationary worm bar extending from the standard, a collar threaded upon the bar, a plurality of bars rigidly associated with the collar and projecting radially therefrom, arms slidably associated with the bars and depending therefrom for engaging the tire arranged upon the rim and means for limiting the swinging of the arms in a certain direction during the turning of the collar to force the tire from the rim by the engagement of the arms therewith.

2. In a tire removing machine of the character described, a standard, means surrounding the standard for supporting a tire carrying rim, said means being adjustable for supporting rims of various sizes, a worm bar projecting from the standard, a collar threaded upon the bar, a plurality of radially extending bars associated with the collar, arms slidable upon the bars, means in the lower ends of the arms for engaging the tire upon the rim to cause the forcing of the tire from the rim when said collar is turned downwardly and means for limiting the inward swinging movement of the arms while in engagement with the tire and while said collar is rotated in a tire engaging direction.

3. In a tire removing machine of the character described, a standard, means surrounding the standard for supporting a tire carrying rim, and including adjustable means for accommodating rims of various sizes, a worm bar projecting from the standard, a collar threaded upon the bar, a plurality of radially extending bars associated with the collar, arms slidable upon the bars, means in the lower ends of the arms for engaging the tire upon the rim to cause the forcing of the tire from the rim when said collar is turned downwardly and means for limiting the inward swinging movement of the arms while in engagement with the tire and while said collar is rotated in a tire engaging direction, and means between said arms and said means for maintaining the arms at predetermined position upon the bars.

4. In a tire removing machine of the character described, a standard, means surrounding the standard for supporting a tire carrying rim, said means being adjustable for supporting stems of various sizes, a worm bar projecting from the standard, a collar threaded upon the bar, a plurality of radially extending bars associated with the collar, arms slidable upon the bars, means in the lower ends of the arms for engaging the tire upon the rim to cause the forcing of the tire from the rim when said collar is turned downwardly and means for limiting the inward swinging movement of the arms while in engagement with the tire and while said collar is rotated in a tire engaging direction, means between said arms and said means for maintaining the arms at predetermined position upon the bars, said first mentioned means consisting of bumper bars arranged beneath the collar carrying bars in spaced parallel relation therewith and said second mentioned means consisting of ribs upon the bumper bars, and cooperating ribs upon the adjacent sides of said arms.

In testimony whereof I affix my signature.

EMZY T. TURNER.